3 Sheets--Sheet 1.

J. BALL.

Envelope-Machine.

No. 6,540. Reissued July 13, 1875.

WITNESSES. Otto Strafeland
Louis Bilhuber

INVENTOR. James Ball
per Van Santvoord & Hauff Attys

3 Sheets--Sheet 2.

J. BALL.

Envelope-Machine.

No. 6,540. Reissued July 13, 1875.

Fig. II.

WITNESSES.
Otto Stufeland.
Ernst Bilhuber

INVENTOR. James Ball
per
Van Santvoord & Hauff
Attys

3 Sheets--Sheet 3.

J. BALL.

Envelope-Machine.

No. 6,540.

Reissued July 13, 1875.

Witnesses.

Otto Schiefland

Ernst Bilhuber.

Inventor.

James Ball per

Van Santvoord & Hauff

Attys.

UNITED STATES PATENT OFFICE.

JAMES BALL, OF BROOKLYN, NEW YORK, ASSIGNOR TO SAMUEL RAYNOR & CO.

IMPROVEMENT IN ENVELOPE-MACHINES.

Specification forming part of Letters Patent No. 78,353, dated May 26, 1868; reissue No. 6,540, dated July 13, 1875; application filed May 4, 1875.

*To all whom it may concern:*

Be it known that I, JAMES BALL, of Brooklyn, in the county of Kings and State of New York, have invented a certain new and useful Improvement in Envelope-Machines, of which the following is a specification:

This invention is illustrated in the accompanying drawing, in which—

Figure 1:
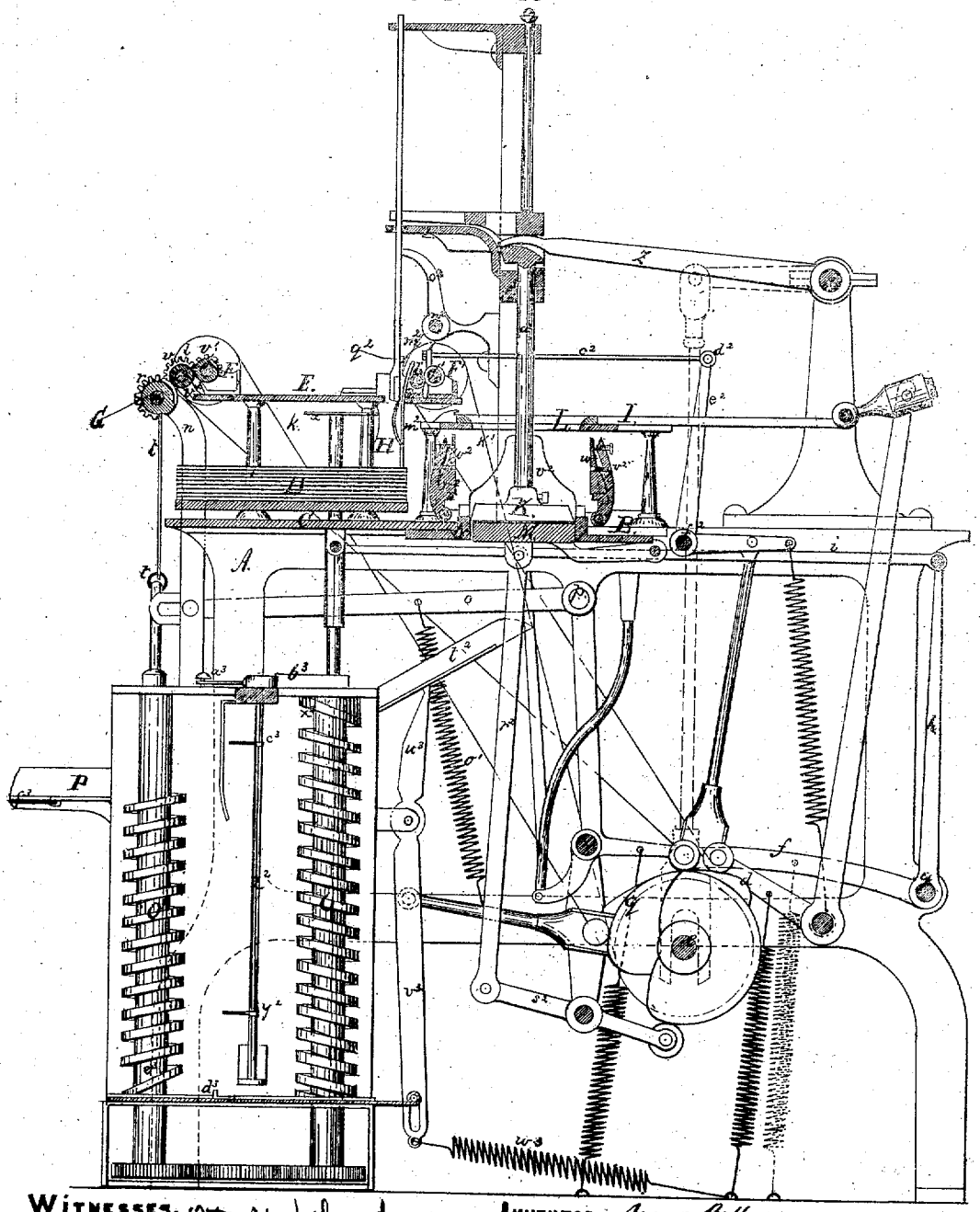
Figure 2:
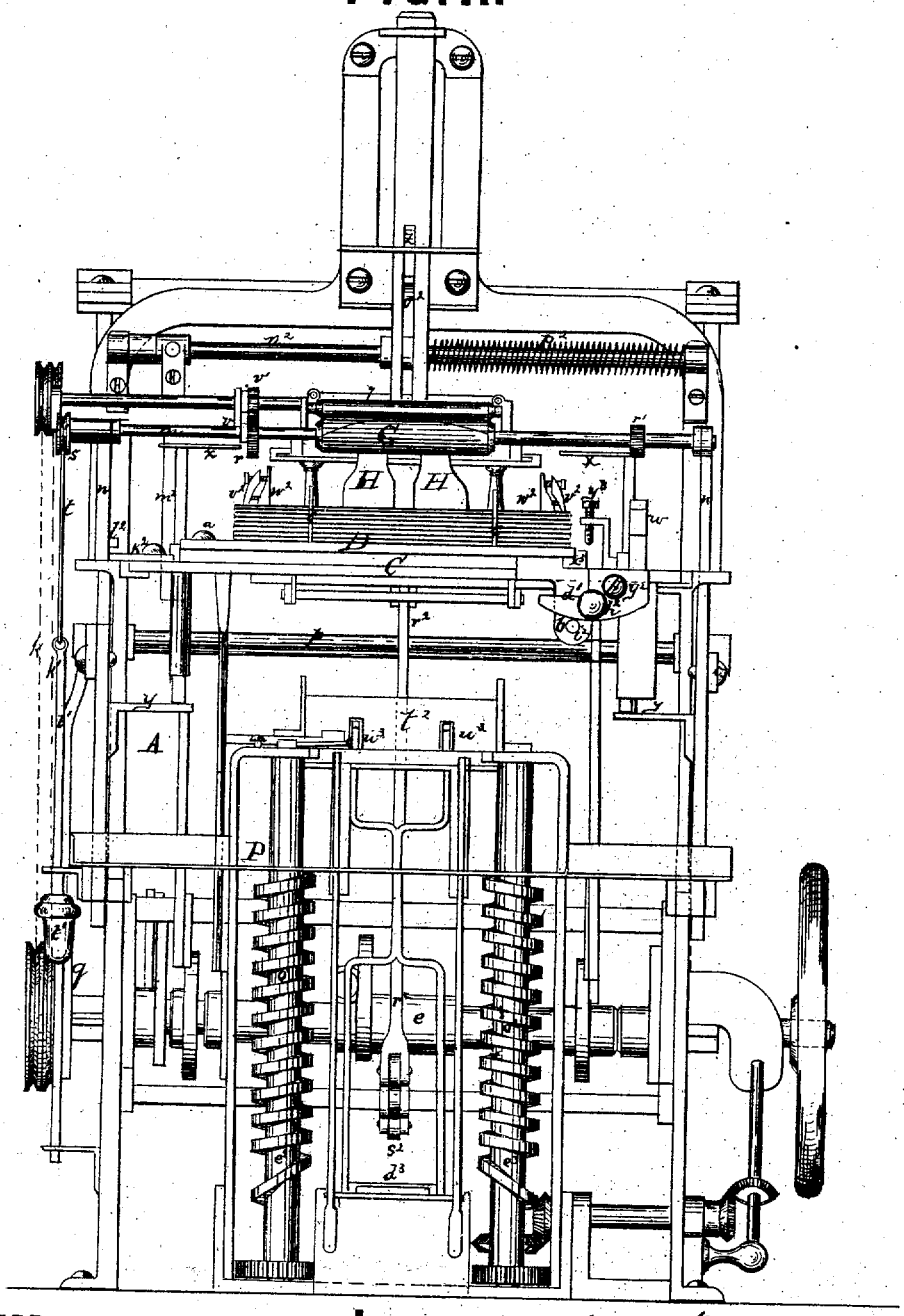
Figure 3:
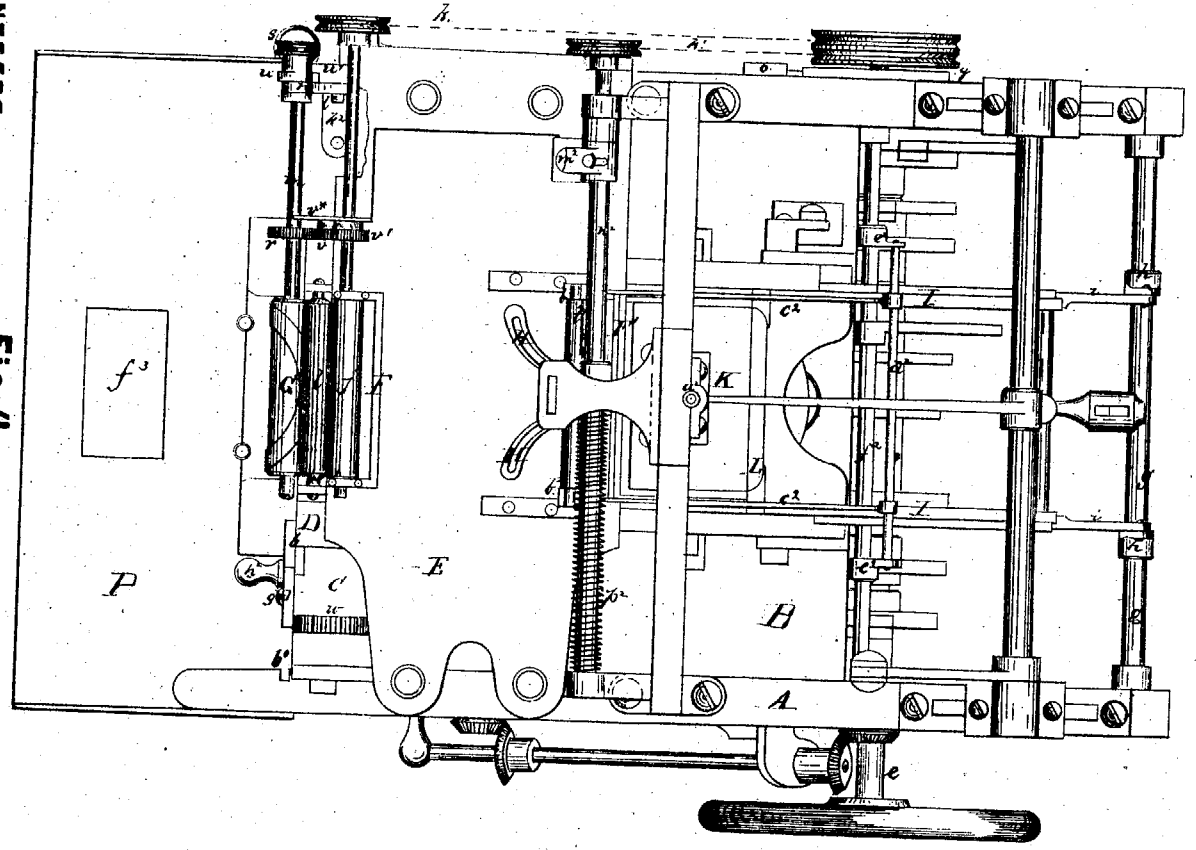
Figure 4:
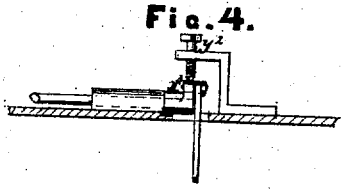

Figure 1 represents a longitudinal vertical section. Fig. 2 is an end view. Fig. 3 is a plan or top view. Fig. 4 is a detached view of the folding-wing which acts on the seal-flap.

Similar letters indicate corresponding parts.

This invention relates to certain improvements in envelope-machines of that class in which the gum is applied to the seal-flaps of the blanks just before the same are carried into the folding mechanism.

The invention consists, first, in a revolving gummer, provided with a suitable projection, and moving at a different speed from the table which supports the pile of blanks, in combination with this table, which has a reciprocating motion in such a manner that the gummer, in passing over, will spread the gum evenly on the sealing-flap; second, in combining with the gummer a mechanism for imparting to said gummer a compound rising and falling and revolving motion, in such a manner that the same is depressed on the pile of blanks and caused to revolve thereon for the purpose of applying the gum, and then raised clear of the pile of blanks and brought in contact with the gumming-rollers, when it is again revolved for the purpose of taking up the requisite supply of gum; third, in a cam-stop and weight or spring, in combination with a shaft of the revolving gummer, in such a manner that by the combined action of the cam-stop and weight or spring the pinions on the shaft of the revolving gummer are always held in the required position to drop in gear with the appropriate pinions or racks; fourth, in the combination of an automatic self-adjusting clamp with the pile of blanks, so as to retain said pile firmly in position while the gum is applied to any portion of the first or top blank in the pile, and to release the same and permit the top blank being carried off by the pickers at the proper intervals; fifth, in combining with the platform which supports the pile of blanks a mechanism for imparting to said platform a motion under the gummer and picker, so that the pile of blanks is alternately brought under the gummer, which applies gum to the seal-flap, and then under the picker, which applies gum to the lower flap and raises the blank up to be carried off by the conveyer; sixth, in the combination of an automatic stop-motion with the gummer and the picker, and with the blank-supporting platform, so as to retain said picker and gummer in such a position that they do not interfere with the operation of putting in new work; seventh, in the combination with the creasing-box of distinct strips, which catch over the edges of said creasing-box, so that the same can be set to correspond to any variation or defect in the knife or in the blanks fed to the folding mechanism; eighth, in the combination of detachable heels with the folding-wings and with the folding-table, said heels being provided with one or more set-screws, so that the wings can rest level on the folding-table, and thereby press the gum on the lower flaps uniformly over their entire surfaces, while the thickness of the edges of the envelopes can be adjusted to suit the demand of the trade; ninth, in the combination, with an envelope-folding mechanism, of spiral carriers or worm-screws, for the purpose of carrying the envelopes along and retaining them free from pressure until the gum on the seal-flaps has had time to dry; tenth, in the combination of two or more sets of spiral carriers or worm-screws running in opposite directions, so that the envelopes are delivered from one set of carriers to the other, and that the same are retained by said carriers a sufficient length of time to allow the gum on the seal-flap to dry; eleventh, in combining with the receiving ends of the spiral carriers threads of an increased pitch, to facilitate the entrance of the envelopes; twelfth, in the combination, with the envelope-carrying device, of a separator, acting at suitable intervals on the envelopes, while the same are supported by the carrying device, for the purpose of preventing the seal-flap of one envelope from adhering to the body of the next succeeding envelope, or to any part of the mechanism; thirteenth, in the combination of a reciprocating conveyer with two or more sets of envelope-carriers for the purpose of transferring the envelopes from one set of carriers to the other; fourteenth, in the combination of a transparent panel with the receiving-table of an envelope-folding machine and with envelope-carriers, so that the operator is enabled to watch said carriers and the mechanism connected with them, and to correct any irregularities occurring in the motion of the envelopes through said carriers before any injury is produced.

In the drawing, the letter A designates the frame of my machine, which is made of cast-iron or any other suitable material, and which supports the fixed bed B and the movable table C. On this movable table rests a platform, D, being hinged to the table by a pivot, *a*, Fig. 2, which passes through one end of the same, and being provided with a thumb-piece or lip, *b*, connected to its other end, so that by pulling the thumb-piece, said platform can be turned in or out. This hinged platform is intended to receive and support the pile of blanks, which are held in the proper position by studs *c* rising from the platform, and which are introduced when the platform is turned out. When the platform is turned in, and occupies its working position, the blanks could not be introduced except at much loss of time. When the platform is turned in, it is locked by the latch $d^1$, which is pivoted to the front edge of the movable table, and which also forms the main element of the stop motion, as will be presently explained.

The table C is fitted in suitable ways in the frame A, and a reciprocating motion is imparted to it by means of a cam, *d*, Fig. 1, which is mounted on the driving-shaft *e*, and acts on an arm, *f*, that extends from a rock-shaft, *g*, which has its bearings in the rear part of the frame A. This rock-shaft connects by two arms, *h*, and rods *i*, with the table, as shown in Figs. 1 and 3.

Above the table C rises a plate, E, which rests on suitable standards rising from the frame A, and this plate forms the support for two gum-boxes, F F′, (best seen in Figs. 1 and 3.) Each of these gum-boxes is provided with a roller, *j* or *j′*, to which a continuous revolving motion is imparted by belts *k* $k^1$ from the driving-shaft *e*. Close to the roller *j*, in the gum-box F, is a secondary roller, *l*, which turns freely in its bearings, and receives a revolving motion by frictional contact with the roller *j*, so that the gum taken up by this last-named roller is transferred to the revolving gummer G, which is mounted on the shaft *m*.

This shaft has its bearings in slides *n*, to which a rising and falling motion is imparted by the combined action of springs $o^1$ and arms *o*, which extend from a rock-shaft, *p*, which derives its motion from a cam, *q*, on the driving-shaft.

On the shaft *m* are mounted two pinions, *r* $r^1$, and a pulley, *s*, on which winds a cord, *t*, carrying a weight, $t^1$, for which a spring may be substituted, if desired, and from the hub of which extends a tappet, *u*, Fig. 3. When the shaft *m* is permitted to follow the action of the weight *t*, the tappet *u* is brought up against a stop, $u^1$, projecting from one of the slides *n*, and by these means the pinions *r* $r^1$ are held in such a position that, when the slides *n* rise the pinion *r* will engage correctly with a pinion, *v*, and when the slides descend the pinion $r^1$ will engage correctly with the toothed rack *w*. The pinion *v* is mounted on a stud, which is fastened in a bracket, *v**, that is secured to the plate E, and it gears into a pinion, $v^1$, which is mounted on the arbor of the gum-roller *j*, and revolves with the same, and when the pinion *r* drops into gear with the pinion *v*, a partial revolving motion is imparted to the gummer G, causing its surface to roll against the distributing gum-roller *l*, and thereby said revolving gummer is supplied with the requisite amount of gum. While the gummer G is thus revolved, the cord *d* is wound up on the pulleys *s*, and as soon as the slides descend far enough to throw the pinion *r* out of gear with the pinion *v*, the weight $t^1$ drops down, causing the shaft *m* to turn, and throwing the gummer G in the proper position to transmit its gum to the first blank on the platform D, and in order to bring said blanks under the revolving gummer, the table C, with the platform, moves out to its extreme position. As the revolving gummer descends the pinion $r^1$ drops in gear with the toothed rack *w*, which is fitted into the table C, and which is supported by springs, so that it can yield to the pressure of the pinion, and recede, until the gummer strikes the pile of blanks.

At the moment the table begins to move in toward the folding mechanism the gummer is made to revolve on the first blank by the action of the toothed rack *w* on the pinion $r^1$, so as to transmit its gum to the seal-flap, and the pinion $r^1$ is so proportioned that the circumferential velocity of the gummer is greater or less than the velocity of the reciprocating table, so that a wiping motion is produced, whereby the transmission of surplus gum to the flaps is prevented. After this object has been accomplished the slides *n* rise, the pinion $r^1$ disengages from the rack *w*, and the gummer is carried back to its original position by the weight $t^1$.

While the revolving gummer acts on the pile of blanks, said pile is subjected to the action of a clamp, *x*, which is composed of two fingers, extending from vertical rods, which slide up and down freely in sockets in the table C. The lower ends of these rods bear on bracket *y*, which extends from the slides *n*, and, as these slides rise, the clamp is raised clear of the pile of blanks, so as not to interfere with the action of the pickers H; but when the slides descend the clamp sinks down by its own gravity, and bears on the pile of blanks, retaining the same firmly in position while the revolving gummer takes effect.

The pickers H are raised by means of an arm, $z$, which extends from the plunger-rod $a^2$, and they descend by their own gravity until they strike the pile of blanks, the arm $z$ being made to work in a slot, so that its motion is not limited by that of the pickers.

When the pickers have arrived in their highest position, (which is the case while the revolving gummer transmits its gum to the seal-flap,) the distributing gum-roller $l^1$ of the gum-box F' is moved out in such a manner that it rolls along under the pickers and transmits the requisite supply of gum to the picker-faces. To effect this motion, said distributing gum-roller has its bearings in a carriage, $b^2$, which moves between suitable guides on the top of the plate E, motion being imparted to it by rods $c^2$, which extend from said carriage to a rod, $d^2$, secured to arms $e^2$, which are mounted on a shaft, $f^2$, to which a rocking motion is imparted, at the required intervals, by a cam on the driving-shaft. After the pickers have been thus supplied with gum the roller $l^1$ recedes, the table C with the blanks moves in, and the pickers descend until they strike the pile of blanks. By these means gum is transmitted to the lower flap of the first blank, and when the pickers rise said blank adheres to them, and is raised from the pile to the proper position to be received by the conveyer I.

In order to prevent the pickers and the revolving gummer from descending when the platform D is not in the proper working position, and particularly to obtain time for introducing new work, I have applied an automatic stop-motion, which will now be described. When the platform D is turned in to its working position, it is locked by the latch $d^1$, as has been previously stated. This latch is attached to the outer end of the table C (Fig. 2) by a pivot, $g^2$, and it is operated by a button or thumb-piece, $h^2$. When turned to its locking position it rests on a stop, $i^2$, secured in the lip $b$, which is connected to the platform D, and serves to move the same in or out. When the latch is reversed on its pivot, its tip strikes the end of the frame A, and its heel still projects over the lip $b$, and prevents the platform D being moved until the table C has reached the inner end of its stroke. At that point the tip of the latch $d^1$ drops into a notch, $b^6$, (Fig. 3,) in the frame, and the heel of said latch releases the lip $b$, leaving the platform D free to be moved out from under the plate E. At the same time a small plate, $k^2$, (Figs. 2 and 3,) which is secured to the table C, has arrived under a stop, $l^2$, which projects from the inner surface of one of the slides $n$, and by these means the slides are prevented from following the action of their springs $o^1$.

Simultaneously with this action the inner edge of the table C bears on a spring-arm, $m^2$, which extends from an arbor, $n^2$, on which is mounted a toe, $o^2$, and which is subjected to the action of a spring, $p^2$. This spring has a tendency to throw the toe back, so that its point will clear a projection, $q^2$, on the inner surface of the rod to which the pickers are secured. But if the table bears against the arm $m^2$ the toe is thrown forward, so that it catches under the projection $q^2$, and the pickers are prevented from descending. The platform D can now be turned out and new work put in without stopping the main shaft of the machine, and, after the platform has been readjusted the latch $d^1$ is turned back, and the operation of the machine progresses, as heretofore described.

The conveyers I are constructed like those of any common envelope-machine, and they carry the blank which they take from the pickers under the creasing-plunger K. This plunger receives its motion from a suitable cam on the driving-shaft, and it forces the blank down through the upper creasing-box L, and delivers it on the folding-table M. This table is supported by a rod, $r^2$, which is pivoted to a rocking arm, $s^2$, and by said arm it receives a rising and falling motion, causing it to pass up into the lower creasing-box N to the position which it occupies in Fig. 1, and then down to discharge the folded envelope, and as it descends it is tilted on the pivot which forms its connection with the rod $r^2$, so that the folded envelope will slide off on the chute $t^2$.

On the edges of the lower creasing-box are the folding wings $w^2$ $w^2$, and after the creased envelope has been delivered on the folding-table, these wings turn in the proper order to produce the operation of folding. Said wings are mounted on oscillating spindles or arbors, to which the required motion is imparted from the main shaft, and their pressure is regulated by heels $v^2$, which are adjustable by one or more set-screws.

By this arrangement the folding-wings can be made to rest level with the folding-table, and thereby the lower flaps are pressed down evenly, while the edges of the envelopes are left unpressed, and envelopes of greater or less thickness can be produced to suit the demand of the trade.

The wing which acts on the seal-flap of the envelopes is operated like the other folding-wings by a crank, $x^3$, mounted on one end of its arbor, and, as said wing turns down, this crank strikes a stop, $y^3$, which consists of a screw, so that it can be adjusted, and the said folding-wing is prevented from pressing the seal-flap close down on the body of the envelope. By adjusting the stop $y^3$, the distance to which the seal-flap is pressed down can be adjusted. (See Fig. 4.)

The sides of the lower creasing-box N are adjustable, so that said box can be slightly increased or decreased, to correspond to any irregularity in the knives or to any defect in the blanks.

The chute $t^2$ is perforated with two slots, to admit fingers $u^3$, which extend from the top end of a lever, $v^3$, (Fig. 1,) that receives a vibrating motion by the combined action of a cam on the driving-shaft, and of a spring, $w^3$. As the fingers $u^3$ come in contact with the envelope sliding down over the chute, they push the same into the first set of carriers O. This set consists of one or more pairs of worm-screws, each pair containing one right and one left hand screw, placed parallel to each other, and made to revolve in such a direction that they carry the envelopes delivered to them down. The upper end of each carrier is provided with a screw-thread, $x^2$, of increased pitch, so that the envelopes on dropping down from the chute are caught and delivered to the threads of the carrier, and the spread of the carriers is such that they complete one revolution while the folding mechanism completes one envelope. The envelopes delivered to the spiral carriers are, therefore, separated by the intervening screw-threads, and they are carried down without being exposed to the slightest pressure, which might have a tendency to cause the seal-flaps to adhere to the bodies of the envelopes. It happens sometimes, however, that the seal-flap of one envelope bears against the body of the next succeeding envelope, and adheres to it by small drops of gum projecting over the edge of said seal-flap, and I have, therefore, applied a separator, $y^2$, which consists of an arm extending from an upright shaft, $z^2$, to which a rocking motion is imparted by the combined action of a spring, $a^3$, and of a cam, $b^3$, which is mounted on the upper end of the gudgeon of one of the spiral carriers, (Fig. 1.) This operator sweeps through between the several envelopes, and separates the seal-flaps if they should happen to adhere to the bodies of the succeeding envelopes, Fig. 5.

An arm, $c^3$, extending from the upper part of the shaft $z^2$ assists in causing the envelopes to arrive in the proper position between the spiral carriers. On reaching the bottom end of the carriers O the envelopes are discharged upon the conveyer $d^3$, to which a reciprocating motion is imparted by the action of the lever $v^3$. By this conveyer one envelope after the other is delivered to the second set of spiral carriers O′. These carriers are constructed similar to the carriers O, but they revolve in such a direction that the envelopes delivered to them are carried up. Each of the carriers O′ is provided with a screw-thread, $e^3$, of increased pitch at its bottom end, so that the same are enabled to receive the envelopes from the conveyer $d^3$ without failure. On reaching the top ends of the carriers O′, the gum on the envelopes has dried, and the envelopes can be put up in packages without delay. For this purpose a table, P, is attached to the end of the frame A, at such a height that the envelopes on arriving at the top ends of the carriers O′ can be readily counted off, taken out, placed on said table, and put up as desired. The table P is provided with a transparent pane, $f^3$, (Figs. 1 and 3,) so that the operator is enabled to watch the action of the carriers, and to see that no disorder takes place as the envelopes pass through said carriers. By these means an envelope-machine is obtained, which gums the seal-flaps as well as the lower end flaps, and which completes the envelopes, so that the operator has nothing to do but to keep the requisite supply of blanks in the machine, and to take the finished envelopes out.

What I claim as new, and desire to secure by Letters Patent, is—

1. The combination of a revolving gummer having a suitable projection, with a reciprocating table supporting the pile of blanks, said gummer moving at a different speed from the table, substantially as described, so that the gummer in revolving against the first blank in the pile will apply the gum evenly on the seal-flap of said blank.

2. In combination with the gummer of an envelope-machine, the mechanism, substantially as described, for imparting to said gummer a compound rising and falling and revolving motion, whereby the same is depressed on the pile of blanks, and caused to revolve thereon, for the purpose of applying the gum, and then raised clear of the pile of blanks and revolved in contact with the gumming-rollers to receive a fresh supply of gum.

3. The combination of a cam-stop and weight or spring with the shaft of the revolving gummer, and with the pinions mounted on said shaft, substantially as described, whereby said pinions are always retained in the proper position to drop in gear with the appropriate pinions or racks.

4. The combination of the clamp $x$ and slide $n$ with the vertical rods and bracket $y$, for operating on the pile of blanks, substantially as described.

5. The combination, with the blank-supporting platform, and with the gummer and picker, of the mechanism, substantially as described, for imparting to said platform a motion under the gummer and picker, whereby the pile of blanks is alternately brought under the gummer, which applies gum to the seal-flap, and then under the picker, which applies gum to the lower flap.

6. The combination of an automatic stop-motion, substantially as described, with the gummer, the picker, and the blank-supporting platform, whereby said gummer and picker are thrown out of operation when the platform is turned out to receive new work.

7. The combination, with the creasing-box, of distinct strips, which catch over the edges of said box, substantially as described, so that the same can be set to variations in the blanks.

8. The combination of detachable heels with the folding-wings and with the folding-table, substantially as described, so that envelopes of more or less thickness can be made to suit the demand of the trade.

9. The combination, with an envelope-folding mechanism, constructed substantially as described, of spiral carriers or worm-screws for carrying the envelopes until the gum on the seal-flap has dried.

10. The combination of two or more sets of spiral carriers or worm-screws running in opposite directions, substantially as and for the purpose set forth.

11. The combination of threads, having an increased pitch, with the receiving ends of the spiral carriers, to facilitate the entrance of the envelopes, substantially as described.

12. The combination, with a device for carrying the envelopes of a separator acting at suitable intervals on the envelopes, while the same are supported by the carrying device, substantially as and for the purpose described.

13. The combination of a reciprocating conveyer, substantially as described, with two or more sets of envelope-carriers, for transferring the envelopes from one carrier to the other.

14. The combination of a transparent panel with the receiving-table of an envelope-folding machine, and with the envelope-carriers, substantially as and for the purpose described.

In testimony that I claim the foregoing, I have hereunto set my hand and seal this 15th day of April, 1875.

JAMES BALL. [L. S.]

Witnesses:
W. HAUFF,
E F. KASTENHUBER.